Feb. 1, 1949.　　　G. E. ARMINGTON　　　2,460,725
SPRINGING ARRANGEMENT FOR TRACTOR-TRAILERS
Filed May 2, 1946　　　3 Sheets-Sheet 1
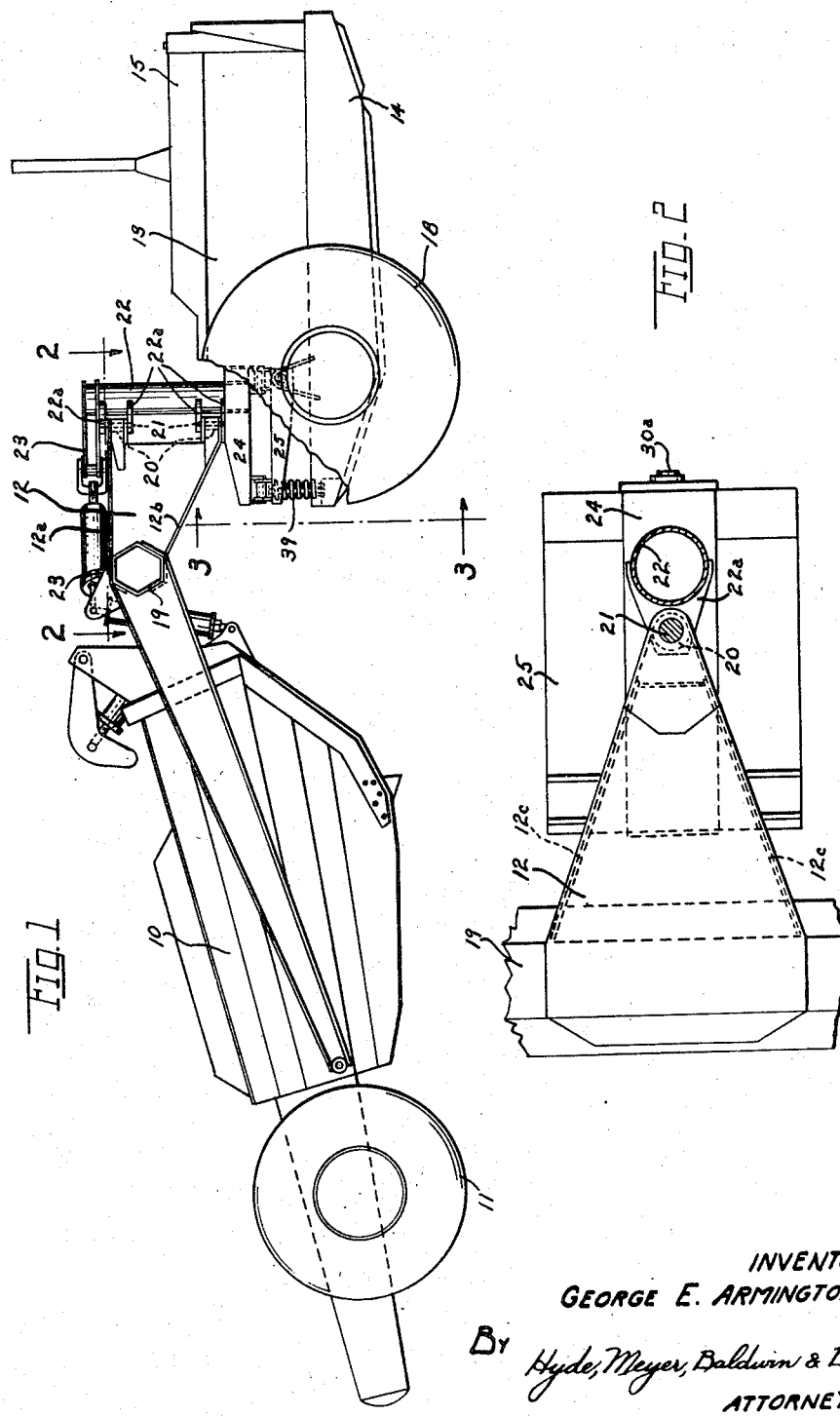
INVENTOR
GEORGE E. ARMINGTON
By Hyde, Meyer, Baldwin & Doran
ATTORNEYS

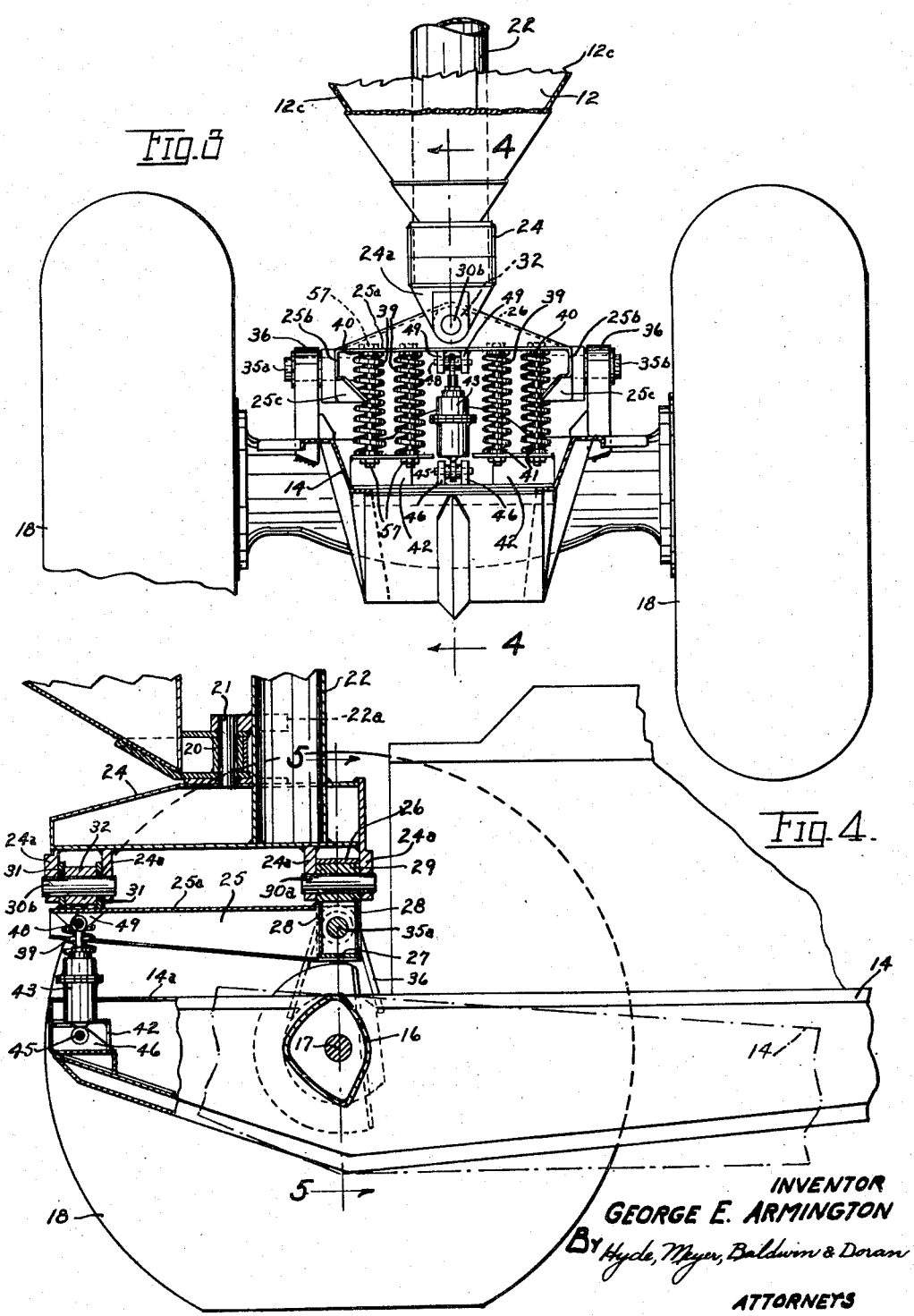

Feb. 1, 1949.                G. E. ARMINGTON                2,460,725
            SPRINGING ARRANGEMENT FOR TRACTOR-TRAILERS
Filed May 2, 1946                                      3 Sheets-Sheet 3
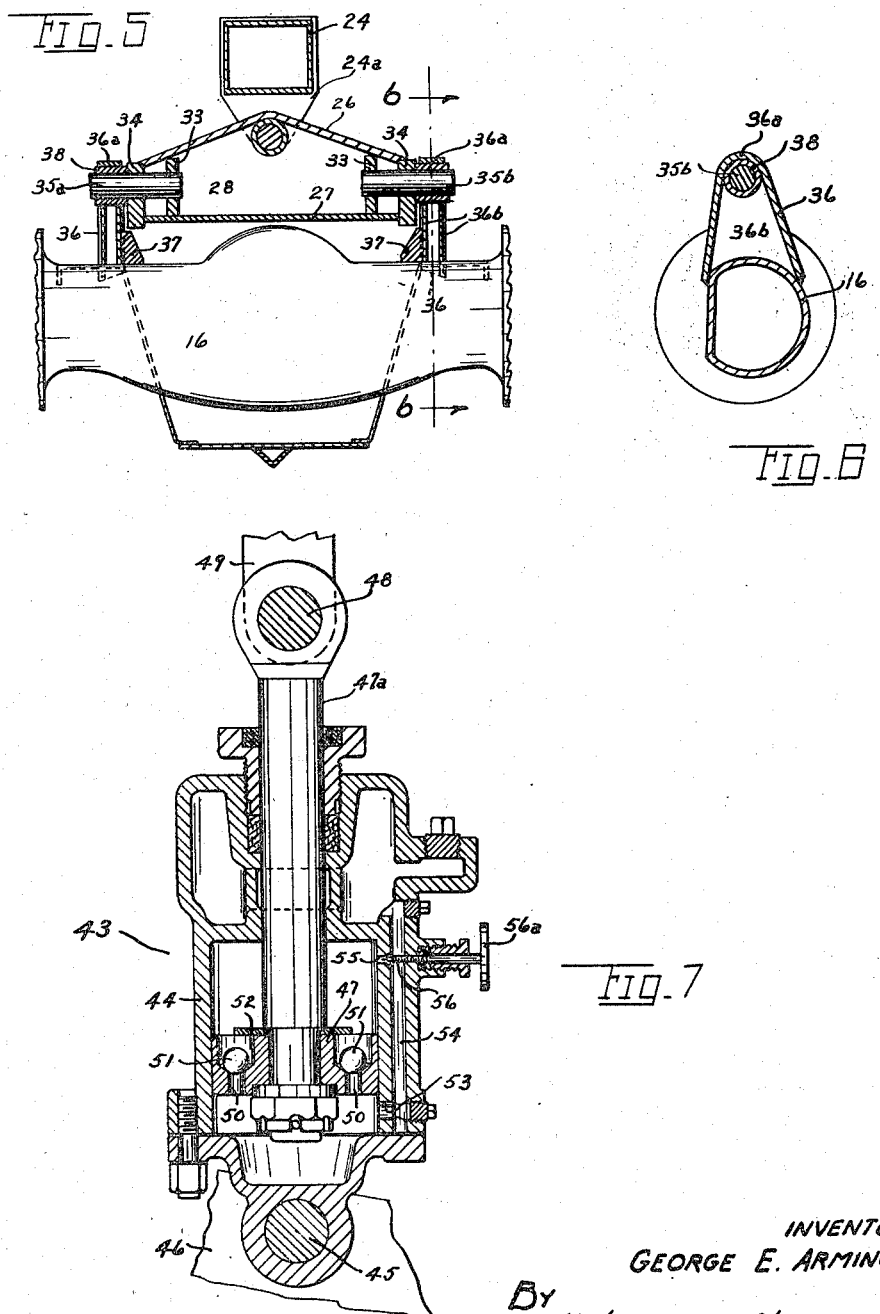
INVENTOR
GEORGE E. ARMINGTON
BY Hyde, Meyer, Baldwin & Doran
ATTORNEYS Patented Feb. 1, 1949

2,460,725

UNITED STATES PATENT OFFICE 2,460,725

SPRINGING ARRANGEMENT FOR TRACTOR-TRAILERS

George E. Armington, South Euclid, Ohio, assignor to The Euclid Road Machinery Co., Euclid, Ohio, a corporation of Ohio Application May 2, 1946, Serial No. 666,650

17 Claims. (Cl. 280—33)

This invention relates to improvements in a springing arrangement for a composite vehicle comprising front and rear parts articulated for relative movement in a vertical plane and wherein the springing arrangement is associated with the connecting means between the front and rear parts.

An object of the present invention is to provide means for absorbing the shocks of rough terrain over which the vehicle may pass with the general purpose of smoothing the travel characteristics of the vehicle.

My invention is particularly applicable to a vehicle in which the forward end thereof comprises a pair of drive wheels and an engine whose weight is overhung in front of said wheels, whereby there is a normal tendency for the engine to oscillate about said wheels when the vehicle is travelling over rough ground. One of the objects of the present invention is to hold this oscillation to a minimum.

Another object of the present invention is to provide spring means adapted to be loaded upon oscillation of the overhung engine in one direction, as described above, together with dashpot means or a similar device for retarding the movement in the opposite direction.

Another object of the present invention is the combination of novel shock absorbing means with an improved hitch between a tractor and trailer whereby to produce novel results, as hereinafter described.

Other objects and advantages of the present invention will be apparent from the accompanying drawings and description, and the essential features thereof will be set forth in the appended claims.

In the drawings,

Fig. 1 is a side elevational view of a tractor-trailer unit embodying my invention, with a portion thereof broken away to more clearly show the construction;

Fig. 2 is a fragmental sectional view taken approximately along the line 2—2 of Fig. 1;

Fig. 3 is a fragmental sectional view taken along the line 3—3 of Fig. 1;

Fig. 4 is a fragmental sectional view taken along the line 4—4 of Fig. 3, with the central dashpot shown in elevation;

Fig. 5 is a fragmental sectional view taken along the line 5—5 of Fig. 4;

Fig. 6 is a sectional view taken along the line 6—6 of Fig. 5; while

Fig. 7 is an enlarged sectional view taken along the central portion of the line 4—4 of Fig. 3 and showing the dashpot in section.

Difficulties are encountered in the travel of vehicles of a long wheel base at relatively high speeds over rough roads and terrain generally. There is a tendency for such a vehicle to ride very rough, reflecting every bump negotiated. This is particularly true in that type of vehicle where the engine overhangs the front wheels because the engine tends to oscillate about the front wheels whenever the latter go over a bump. The present invention does away with this difficulty so that a device of this character may travel smoothly over rough ground at a speed hitherto so uncomfortable for the driver of the vehicle, and so hard on the mechanism of the vehicle as to be regarded heretofore as impossible.

Without intending in any way to limit the use of my invention, I have chosen to illustrate the same in combination with a trailer unit involving a scraper body 10 supported by rear wheel means 11 and by front drawbar means 12 upon a tractor device 13. The tractor comprises a frame or chassis 14 supporting an engine beneath the hood 15 in a known manner. Carried by the frame 14 is an axle housing 16 rigid with the tractor frame and supporting a drive axle 17. The axle housing supports a pair of drive wheels 18 which have a driving connection (not shown) with the drive axle means 17. It results from this construction that most of the weight of the engine and a large proportion of the weight of the scraper body 10 and of the load carried thereby is transmitted to the wheels 18 thus aiding in their tractive effect. It should be obvious that as the wheels 18 go up and down there is a tendency for the weight of the engine to lag behind, thus emphasizing the disturbance to the vehicle caused by the bump passed over. The present invention permits the front end of the overhung engine to remain pretty much in a steady plane while the truck wheels go up and down.

It is necessary to understand the hitch construction before describing the shock absorbing features thereof. The front end of the scraper body 10 is provided with a rigid cross beam 19 hexagonal in section. Rigid with this cross beam is the drawbar 12 which comprises top and bottom plates 12a and 12b respectively, generally triangular in shape, 12a being substantially horizontal and 12b sloping forwardly and downwardly. Side plates 12c rigidly connect the top and bottom plates. Rigid with the front end of the drawbar are upper and lower spaced bushings 20 which are pivotally connected by pins 21 with ears 22a on a vertical cylindrical post 22 which in turn is secured to the tractor frame 14. The pins 21, which are in alinement, thus form a vertical pivot between the tractor and trailer. Means indicated generally at 23 is provided for steering the tractor-trailer unit as is fully disclosed and claimed in my copending application, Serial Number 669,906, filed May 15, 1946, to which reference may be had for further description. This steering apparatus forms no part of the present invention.

The lower end of post 22 is rigidly connected to a box beam 24 which extends in a fore-and-aft direction, as best seen in Figs. 1, 2, 3 and 4. Below this box beam is a bracket 25 and the box beam and bracket are pivotally connected in such a manner as to provide a horizontally disposed pivot for movement of the trailer relative to the tractor. To this end, downwardly extending ears 24a are provided in pairs at the front and rear ends of the beam 24. The bracket 25 comprises a top wall 25a, the sides of which, as best seen in Fig. 3, are bent downwardly at 25b and then inwardly at 25c to provide a very strong construction. At the front end of the bracket 25, a strong cross beam construction is provided comprising a top plate 26 of inverted V-shape, a bottom plate 27, and vertical side plates 28 all rigidly connected together and rigidly connected with the bracket 25. Centrally of this bracket, a bushing 29 is rigidly supported, having an opening registering with similar openings in the forwardly positioned ears 24a and through these passes a pivot pin 30a. At the rear end of bracket 25, upstanding ears 31 support a bushing 32 having a central opening alined with similar openings in the ears 24a associated therewith, and pivot pin 30b provides a connection between the beam 24 and the bracket 25 at this point. The pins 30a and 30b are in axial alinement and provide horizontally disposed pivot means for relative movement between the tractor and the trailer.

The hitch provides a second horizontal pivot means substantially at right angles to the pivot means 30a, 30b, just described, as will presently appear. As best seen in Fig. 5, blocks 33 and 34 are welded to the beam construction 26, 27, 28, previously described, to provide openings through which pass the pivot pins 35a and 35b. The other ends of these pins are supported in brackets 36 which are upstanding from and rigid with the axle housing 16. These brackets 36 comprise inverted U-shaped plates 36a connected by vertical side plates 36b all welded to the housing 16 and braced as indicated at 37, Fig. 5. Bushings 38 carried in the upper ends of the brackets 36 receive the outer ends of the pins 35a and 35b which are in axial alinement. The oscillation of tractor frame 14 about the axle and about wheels 18 is illustrated diagrammatically by the full line and dot-dash line of frame 14 in Fig. 4. This is illustrative only and serves to show the relative separation and approach between the rear end of frame 14 at the portion 14a thereof relative to bracket 25, as shown in Fig. 4. Novel shock absorbing or snubbing means is provided between these relatively movable parts. Referring to Figs. 3 and 4, spring means is provided between bracket 25 and the rear end of frame 14 adapted to be loaded upon relative approach of frame portion 14a and bracket 25. In the present instance this spring means comprises four helical springs 39 vertically disposed between retaining buttons 40 on plate 25a and retaining buttons 41 on angle brackets 42 which are rigidly connected with the rear end 14a of the tractor frame. In the present instance, these springs are equally distributed on opposite sides of the fore-and-aft center line of bracket 25 and frame 14, so as to equalize the load on opposite sides of the center line. It will be obvious from a study of the drawings that the springs 39 are loaded whenever wheels 18 go over a bump which tends to raise the rear end of frame 14, while the engine tends to hold the front end of the tractor frame 14 down.

As best seen in Fig. 3, bolts 57 may be provided if desired, one for each spring 39, connecting plate 25a and brackets 42 in such a manner as to permit relative approach between 25a and 42 but preventing their separation beyond the position shown in Fig. 3. This stabilizes the oscillation of the overhung engine about its wheel and axle support.

Snubbing means is provided to control the rate of return of the springs 39, or in other words, to control the rate of rebound. This snubbing means comprises a dashpot construction 43, the details of which are more clearly understood with reference to Fig. 7. A dashpot cylinder 44 is pivotally connected at its lower end on pin 45 which is held between ears 46 which in turn are rigid with frame 14. A piston 47 reciprocates within the cylinder 44. This piston has a rod 47a which is pivotally connected at its upper end by pin 48 to the ears 49 carried by plate 25a. Openings 50 are provided through the piston 47 and these have ball valves 51 for controlling flow through the piston. These balls are held against escape by a plate 52 secured to the head of the piston. Communication is provided between opposite ends of the cylinder around the piston by the by-pass construction including port 53, passageway 54 and port 55. The latter port is controlled by needle valve 56 which provides an adjustment.

When relative approach occurs as mentioned previously, between the frame portion 14a and bracket 25, at which time springs 39 are loaded, the pivots 45 and 48 of Fig. 7 tend to approach each other which compresses the liquid, such as oil, with which the dashpot is filled. This compression occurs beneath the piston 47 as viewed in Fig. 7, and causes the balls 51 to be lifted from their seats, permitting free flow of liquid through the piston openings 50. This permits the free loading of springs 39. As the springs tend to resume their original position, the pivot pins 45 and 48 are again forced away from each other which immediately causes the balls 51 to close the openings 50 and thereafter, the return of piston 47 upwardly in Fig. 7 can occur only as rapidly as liquid can pass through the port 55, regulated by valve 56, and thence through passageway 54 and port 53 to the lower face of piston 47. Obviously, the needle valve is adjustable by means of the valve 56a so that this dashpot action may be regulated as desired, and the rate of rebound may be controlled.

It results from the above construction that all of the necessary relative movements between the tractor and trailer are permitted by means of the vertical pivot pins 21 and the two sets of horizontal pivot pins 30a, 30b, and 35a, 35b, at right angles to each other. At the same time, relative oscillation of this hitch means relative to the tractor frame is permitted, and oscillation is then resisted by springs 39, the rebound of which is controllable by the dashpot 43. The overall result is a smooth-riding vehicle at relatively high speeds over relatively rough ground.

What I claim is:

1. In the combination of a tractor vehicle and a trailer vehicle drawn thereby, hitch means connecting said vehicles and including horizontally disposed pivot means extending crosswise of said tractor vehicle, said vehicles being oscillatable about said pivot means, spring means mounted between said vehicles on one side of said pivot means only and adapted to be loaded by said vehicle oscillation, and dashpot means operatively connected with said spring means for controlling the unloading action of the latter.

2. In the combination of a tractor vehicle and a trailer vehicle drawn thereby, hitch means connecting said vehicles and including horizontally disposed pivot means extending crosswise of said tractor vehicle, said vehicles being oscillatable about said pivot means, spring means mounted between said vehicles and adapted to be loaded by said vehicle oscillation, and adjustable dashpot means operatively connected with said spring means for controlling the unloading action of the latter.

3. In combination, a tractor having wheel means, a trailer drawn thereby, a connection between said tractor and trailer including pivot means extending crosswise of said tractor in alinement with said wheel means, there being portions of said tractor and trailer extending rearwardly of said pivot means, and spring means between said portions adapted to be loaded and unloaded by relative motion between said portions.

4. The combination of claim 3 including snubber means modifying the action of said spring means.

5. In combination, a tractor having a pair of driving wheels disposed on an axis and having a front portion of said tractor in overhanging relation forwardly of said wheels, a trailer, hitch means between said tractor and trailer including horizontally disposed pivot means above and substantially parallel to said axis, there being opposed portions of said tractor and hitch means spaced from said pivot means, and spring means operatively connected between said opposed portions and adapted to be loaded and unloaded by relative approach and separating movement of said portions.

6. The combination of claim 5 including additional means modifying the action of said spring means.

7. In combination, a tractor having a pair of driving wheels disposed on an axis and having a front portion of said tractor in overhanging relation forwardly of said wheels, a trailer, the sole support of said trailer consisting of wheel means at the rear end thereof and hitch means at the front end thereof, said hitch means including horizontally disposed pivot means above and substantially parallel to said axis, there being opposed portions of said tractor and hitch means spaced from said pivot means, and spring means operatively connected between said opposed portions and adapted to be loaded and unloaded by relative approach and separating movement of said portions.

8. The combination of claim 7 including additional means modifying the action of said spring means.

9. In combination, a tractor having a pair of driving wheels disposed on an axis and having a front portion of said tractor in overhanging relation forwardly of said wheels, a trailer, the sole support of said trailer consisting of wheel means at the rear end thereof and hitch means at the front end thereof, said hitch means including a first bracket, a vertical post rigid with said bracket, vertically disposed pivot means connecting said post and said trailer, a second bracket, horizontally disposed pivot means connecting said brackets and extending in a fore-and-aft direction, horizontally disposed pivot means connecting said second bracket and said tractor, said last named pivot means extending crosswise of said tractor, and spring means operatively connected between said second bracket and said tractor and spaced from said last named pivot means, whereby said spring means is adapted to be loaded and unloaded by relative movement between said second bracket and said tractor.

10. The combination of claim 9 including snubber means operatively connected between said second bracket and said tractor for modifying the action of said spring means.

11. The combination of claim 9 wherein said spring means is symmetrically disposed on opposite sides of first named horizontally disposed pivot means.

12. The combination of claim 9 including a dashpot connected between said second bracket and said tractor, said dashpot being so constructed and arranged that it moves freely as said spring means is loaded and moves in a restricted manner as said spring means is unloaded.

13. In combination, a tractor having a frame and having an axle housing carried by said frame, driving wheels rotatably mounted on opposite ends of said axle housing, there being a front portion of said tractor in overhanging relation forwardly of said wheels, a trailer, the sole support of said trailer consisting of wheel means at the rear end thereof and hitch means at the front end thereof, said hitch means including a first bracket, a vertical post rigid with said bracket and extending upwardly therefrom, vertically disposed pivot means connecting said post and said trailer, a second bracket, horizontally disposed pivot means connecting said brackets and extending in a fore-and-aft direction, horizontally disposed pivot means connecting said second bracket and said axle housing, said last named pivot means extending crosswise of said tractor, spring means operatively connected between said second bracket and said tractor and spaced from said last named pivot means, a dashpot connected between said second bracket and said tractor, and said dashpot being so constructed and arranged that it moves freely as said spring means is loaded and moves in a restricted manner as said spring means is unloaded.

14. In the combination of a composite vehicle having front and read parts articulated for relative movement in a vertical plane, means connecting said vehicle parts and including horizontally disposed pivot means extending crosswise of said vehicle, said vehicle parts being oscillatable about said pivot means, spring means mounted between said vehicle parts on one side of said pivot means only and adapted to be loaded by said oscillation, and snubber means operatively connected with said spring means for controlling the unloading action of the latter.

15. In the combination of a composite vehicle having front and rear parts articulated for relative movement in a vertical plane, means connecting said vehicle parts and including horizontally disposed pivot means extending crosswise of said vehicle, said vehicle parts being oscillatable about said pivot means, spring means mounted between said vehicle parts and adapted to be loaded by said oscillation, and adjustable dashpot means operatively connected with said spring means for controlling the unloading action of the latter.

16. Hitch means between tractor and trailer vehicles including a first bracket, means mounting said trailer vehicle on said bracket for movement about a generally vertical pivot and about a generally horizontal pivot extending on a fore-and-aft direction, a second bracket, a generally horizontal pivot extending crosswise of said tractor vehicle and connecting said second bracket and said tractor vehicle, and spring means operatively connected between said second bracket and said tractor vehicle at a zone spaced from said last named pivot, whereby said spring means is adapted to be loaded and unloaded by relative movement between said second bracket and said tractor vehicle.

17. In combination, a tractor having a frame and having an axle housing carried by said frame, driving wheels rotatably mounted on opposite ends of said axle housing, there being a front portion of said tractor in overhanging relation forwardly of said wheels, a trailer, the sole support of said trailer consisting of wheel means at the rear end thereof and hitch means at the front end thereof, said hitch means including a horizontally disposed pivot extending crosswise of said tractor above said axle housing, a bracket oscillatable about said pivot in unison with said trailer, a portion rigid with said tractor frame extending rearwardly of said housing, and spring means adapted to be stressed by relative movement between said bracket and said last named tractor portion.

GEORGE E. ARMINGTON.

REFERENCES CITED

The following references are of record in the file of this patent:

UNITED STATES PATENTS

| Number | Name | Date |
|---|---|---|
| 1,877,126 | Greer | Sept. 13, 1932 |